US008542743B2

(12) United States Patent
Van Den Berghe

(10) Patent No.: US 8,542,743 B2
(45) Date of Patent: Sep. 24, 2013

(54) METHOD AND ARRANGEMENT FOR PERSONALIZED VIDEO ENCODING

(75) Inventor: Steven Van Den Berghe, Zottegem (BE)

(73) Assignee: Alcatel Lucent, Paris (FR)

( * ) Notice: Subject to any disclaimer, the term of this patent is extended or adjusted under 35 U.S.C. 154(b) by 1171 days.

(21) Appl. No.: 12/268,618

(22) Filed: Nov. 11, 2008

(65) Prior Publication Data

US 2009/0122873 A1 May 14, 2009

(30) Foreign Application Priority Data

Nov. 13, 2007 (EP) .................................... 07291361

(51) Int. Cl.
*H04N 11/02* (2006.01)
(52) U.S. Cl.
USPC .................................................... 375/240.24
(58) Field of Classification Search
USPC .................................................... 375/240.24
See application file for complete search history.

(56) References Cited

U.S. PATENT DOCUMENTS

| 7,012,963 | B2 * | 3/2006 | Zdepski et al. | ........... | 375/240.27 |
| 7,394,850 | B1 * | 7/2008 | Gordon | ..................... | 375/240.01 |
| 2004/0096002 | A1 | 5/2004 | Zdepski et al. | | |
| 2005/0008240 | A1 | 1/2005 | Banerji et al. | | |
| 2009/0180702 | A1 * | 7/2009 | Bordes et al. | ................. | 382/239 |

FOREIGN PATENT DOCUMENTS

| EP | 1 148 733 A2 | 10/2001 |
| JP | 11261966 A | 9/1999 |
| JP | 2004023706 A | 1/2004 |
| JP | 2006319701 A | 11/2006 |
| WO | WO 01/82629 A2 | 11/2001 |
| WO | WO 2007/003627 A1 | 1/2007 |

OTHER PUBLICATIONS

Bottreau V. et al., "Logo Insertion," Video Standards and Drafts, XX, XX, No. JVT-R016, pp. 1-15, Jan. 15, 2006.
Dhondt Y. et al., "Flexible Macroblock Ordering an Error Resilience Tool in H.264/AVC," 2 pages.
European Search Report.
Japanese Office Action—Translation of Notice of Rejection; Mailing Date Oct. 30, 2012; 3 pgs.

* cited by examiner

*Primary Examiner* — Mark Rinehart
*Assistant Examiner* — Matthew Hopkins
(74) *Attorney, Agent, or Firm* — Fay Sharpe LLP

(57) ABSTRACT

When generating an encoded composed video stream based on a common video stream and at least one input stream of personalized information, at least one intermediate stream is generated by mixing the at least one input stream into the common video stream in predetermined positions of the common video stream, taking into account a macroblock grouping in slices, and the at least one intermediate stream is encoded, thereby generating at least one encoded intermediate stream by using the macroblock grouping. The common video stream is encoded using the macroblock grouping, thereby generating an encoded common video stream. The encoded common video stream and the at least one encoded intermediate stream are combined and filtered such that per frame and per slice sequence number only one slice of one stream is selected for forming the encoded composed video stream.

13 Claims, 2 Drawing Sheets

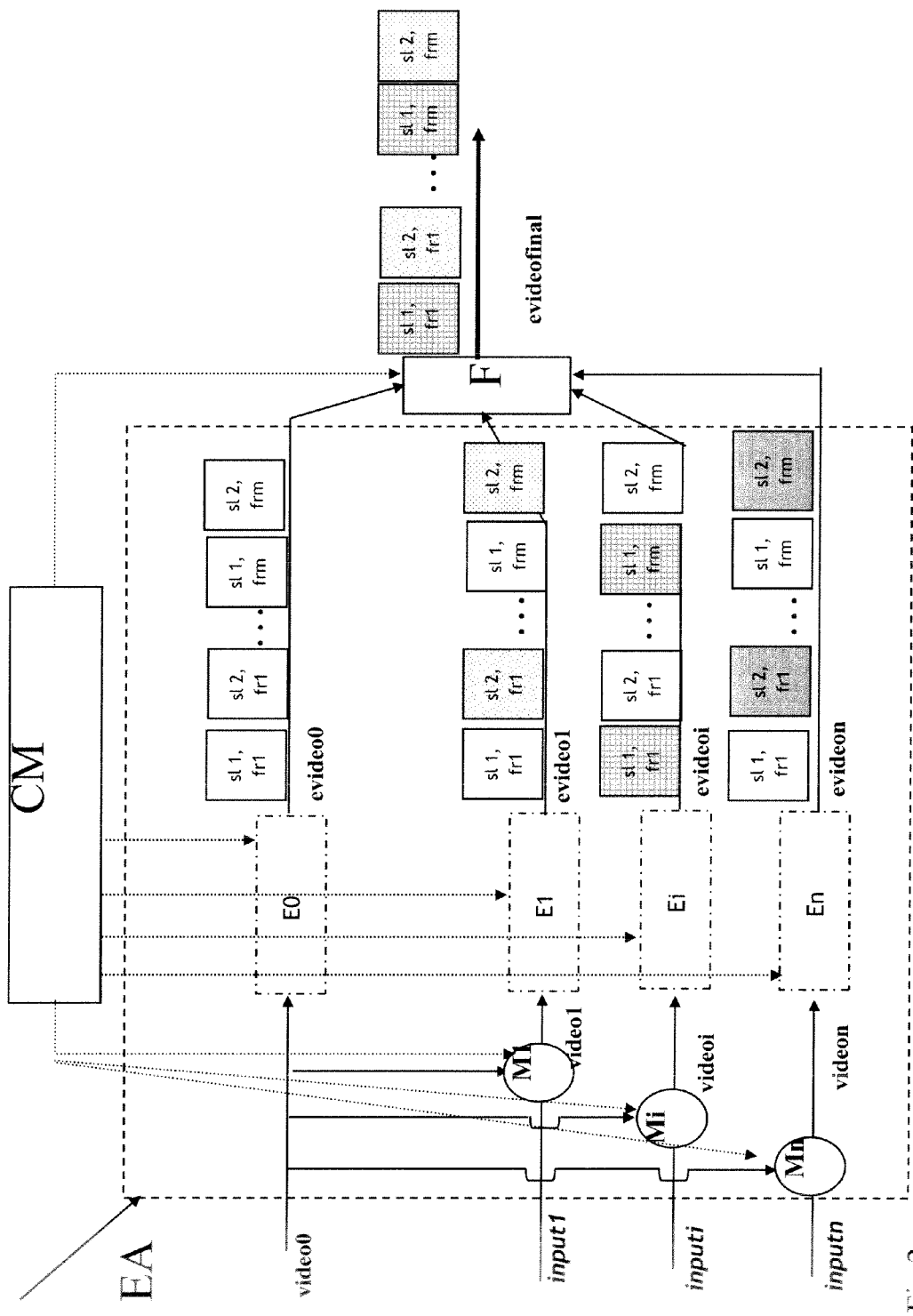

METHOD AND ARRANGEMENT FOR PERSONALIZED VIDEO ENCODING

Figure 1:
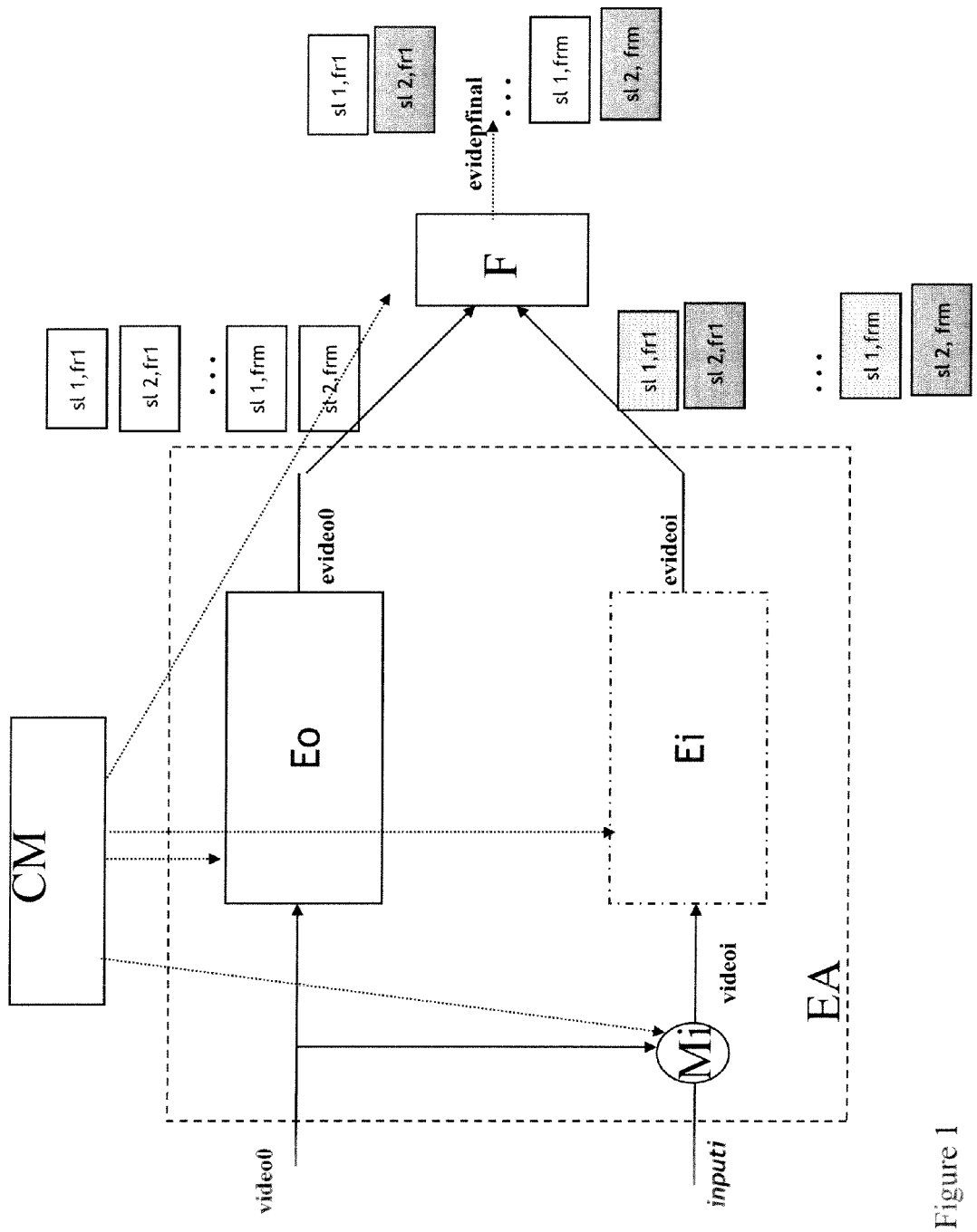

The present invention relates to a method for personalized video encoding, more in particular a method for generating an encoded composed video stream, based on a common video stream and an input stream of personalized information. The present invention relates as well to an encoding apparatus for cooperating with a combining means for realizing the method according to the invention.

Current methods for encoding composed video stream, e.g a main stream such as a television programme, which can be considered as corresponding to a common video stream, to which some broadcast specific or operator specific information such as a logo of this operator, which can accordingly be considered as an input stream of personalized information, is added, encode the complete composed video stream before transmitting it on the medium. At the receiver this complete composed video stream has to be decoded again.

This means that for all content providers, all operators etc, complete encoded video streams need to be transmitted. Also if the same operator wants to add in-picture user-specific information to the same video stream, depending on the user community, such as some specific advertisement especially focused to specific users, each time the complete composed video stream has to be encoded, transmitted and decoded again. Similarly if some users do not need any advertisements at all, also in this case the complete encoded common video stream is to be encoded, transmitted and decoded for these users. An alternative is to rely on complex rendering capabilities in the set-op box, to do the composition at the end-user side.

It is clear that such prior art methods put a heavy burden on the encoding, decoding, transmission or set-op box capabilities.

It is therefore an object of the present invention to present a method for personalized video encoding of the above known kind, but which aims at reducing the amount of data to be encoded, transmitted and decoded again, and allowing to use relatively cheap standard equipment.

According to the invention this object is achieved by the features as explained in the characterizing portion of claim 1.

In this way the common video stream is separately encoded using a macroblock grouping scheme. An example of a macroblock grouping is the flexible macroblock ordering which is already known from the H.264/AVC video coding standard. This standard basically describes advanced compression techniques that were developed to enable transmission of video signals at a lower bit rate. The standard defines the syntax of the encoded video bitstream along with a method of decoding the bitstream. Each video frame is subdivided and encoded at the macroblock level, where each macroblcock is a 16×16 block of pixels.

Macroblocks are grouped together in slices to allow parallelization or error resilience. Each macroblock is further encoded in "intra-prediction" mode in which a prediction macroblock is formed based on reconstructed macroblocks in the current slice, or "inter-prediction" mode in which a prediction macroblock is formed based on the macroblocks of reference frames. The intra-prediction code mode applies spatial information within the current slice in which the prediction macroblock is formed from samples in the current slice that have been previously encoded, decoded and reconstructed. The inter-prediction coding mode utilizes temporal information from previous and/or future reference frames to estimate motion to form the prediction macroblock.

The default H.264 behaviour is to group macroblocks in raster-scan order i.e. scanning fines from left to right) into slices. The H.264 standard however further introduced a new ability, referred to as flexible macroblock ordering, hereafter abbreviated with FMO. FMO partitions a video frame into multiple slice groups, where each slice group contains a set of macroblocks which could potentially be in nonconsecutive positions and could be anywhere in a frame. The conventional method to implement FMO is to encode and then transmit the macroblocks within a slice group.

According to the present invention, the same macroblock grouping scheme, either in raster order slices, or more flexible grouping schemes using FMO, which is used for the encoding of the background or common video stream, is now also used for the encoding of an intermediate stream, which is itself the result of mixing the user specific input stream into the common video stream. During the mixing step information related to this future macroblock grouping, such as the position represented by the picture region where the input stream is added to the common video stream, is to be externally provided or has to be added or inserted as control information into the resulting intermediate stream, in order to enable correct encoding using this same macroblock grouping scheme in a next step.

As the picture region or position within the common video stream where the input stream is to be mixed, is itself linked to a specific slice sequence number within the frame, this extra information will enable subsequent encoding to be performed using the same macroblock grouping in slices.

The encoding step of the common video stream itself, thus using the same macroblock grouping, thereby generates an encoded common video stream comprising a sequence of encoded video frames, whereby each encoded frame is comprised of a sequence of a predetermined number of slices of encoded macroblocks of this common video stream.

By also using the same macroblock grouping scheme for the encoding of the intermediate stream also sequences of frames of the same predetermined number of slices are generated.

The mixing and encoding part of the method are performed by means of an encoding apparatus according to the invention.

In a next step, the appropriate slice from either the encoded common video stream, or from the encoded intermediate stream, is selected within a combining means according to the invention, such that per frame and per slice sequence number only one slice of each stream is selected for further transmission. In this way an encoded composed stream is generated which, for each frame and slice number, contains the selected slice.

This allows to generate an encoded composed video stream by freely selecting the appropriate slices during this combining and filtering step within the combining means. So if the user input stream contains a set of different multimedia elements such as advertisements, logos, . . . to be added in different positions in the frame, the composed stream could either include only the original background common video stream, or include part of this background video stream with only one set of multimedia elements added, or include a composed stream with two or even more multimedia elements added in different positions.

This method thus allows to save on the encoding and transmission capabilities of the system, and to use a simple H.264/AVC standard compliant decoder, possibly with support of the FMO feature to enable more flexible macroblock grouping schemes, without the need of additional graphical rendering capabilities.

The combining and filtering step can take place at the transmission side, but can also take place at the receiver side, or somewhere in the network, as is respectively set out in claims 2 to 4. In the latter case an intermediate node such as e.g. an access node, can select the specific slices from all received encoded intermediate video stream, for thereby forming the final encoded composed video stream, as further set out in claims 2 to 4. In the latter case the encoded composed video stream is further transmitted by this intermediate node to the users coupled to it. In case of several users or receivers coupled to this intermediate node, with each receiver pertaining to a specific different user profile, the combining means in this intermediate node can further generate several of these encoded composed video streams, in correspondence with the specific user profiles of the receivers to which these encoded composed video stream will then be further transmitted. A combining means residing in a transmitter may as well generate several of these streams for further transmission to several users pertaining to a specific profile which are coupled to the transmitter.

Further embodiments are set out in the appended claims.

It is to be noticed that the term 'coupled', used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

The above and other objects and features of the invention will become more apparent and the invention itself will be best understood by referring to the following description of an embodiment taken in conjunction with the accompanying drawings wherein FIG. 1 shows an apparatus for encoding of 1 personalized video stream according to the invention, FIG. 2 shows an apparatus for encoding of one of n personalized video streams according to the invention.

The present invention will be first explained for one input stream of personalized information, as is schematically shown in FIG. 1. A common video stream, denoted video0, is to be mixed with an input stream of personalized information, denoted inputi. In contrast to prior art methods where the mixing outputs a raw video stream that does not allow to identify where the personalization input has been mixed in, the mixing step according to the invention and being performed by mixer Mi, is such as to take into account an macroblock grouping step, mapping the region or position where personalized information is mixed in the common stream to a slice group region. The result of this mixing is an intermediate video stream denoted videoi, comprising the common video stream, but with the personalized information present in the position identified by the macroblock group regions. To this purpose the mixer has to receive or contain the necessary control information to identify the different picture regions where the personalized input stream has to be added to the common video stream. This position is expressed by means of a set of picture regions coinciding with the macroblocks belonging to a given slice number as the next step will use a corresponding macroblock grouping, mapping each macroblock to the specific slice number.

In a next step both the common video stream video0 and the intermediate stream videoi will be encoded using a same macroblock grouping. It is important that this macroblock grouping scheme is compliant to the one identified during the mixing step, meaning that the picture regions where the input stream has been added to the common video stream for the generation of the intermediate stream, are now also used for the slice encoding. This will reflect itself into the number of slices of encoded macroblocks which will result from the encoding. The encoder for encoding vodeo0 is denoted E0, whereas the encoder for encoding videoi is denoted Ei. According to the AVC standard, the resulting encoded common video stream, denoted evideo0, thus comprises a sequence of encoded video frames, and each encoded video frame itself comprises a sequence of this predetermined number of slices of encoded macroblocks of this common video stream. In FIG. 1 a sequence of m frames is shown, wherein each frame includes two slices of encoded macroblocks. These are respectively denoted sl1,fr1—meaning slice1 of frame 1, sl2,fr1—meaning slice2 of frame 1—to sl1,*frm*—meaning slice 1 of frame m—to sl2,*frm*—meaning slice 2 of frame m.

An example of this macroblock grouping is the already mentioned FMO ordering, but other schemes are possible in accordance with the AVC standard.

In accordance to the invention also the intermediate video stream is encoded using this same macroblock grouping scheme, and the resulting encoded intermediate stream will accordingly comprise a corresponding sequence of encoded video frames, whereby each encoded video frame also will comprise a sequence of this same predetermined number of slices of encoded macroblocks. In the example depicted in FIG. 1, a sequence of m frames will thus result, and each frame will comprise two slices of macroblocks. These are denoted in a similar way as the slices of the common video stream.

The contents of these slices of the encoded common video stream is of course different from the contents of the slices of the encoded intermediate stream. This is indicated in the picture by using a different colouring of the boxes representing the consecutive slices. The slices of the common video stream are shown as blank, unfilled boxes, whereas the different boxes depicting slice1 of the encoded intermediate stream are filled with speckles. The different boxes depicting slice2 of the encoded intermediate stream have a grey colour.

Both the mixer Mi and the two encoders Eo and Ei are part of an encoding apparatus EA according to the invention. This encoding apparatus is in general part of a transmitter. In some embodiments this transmitter will then transmit both the encoded common stream evideo0 as well as the encoded intermediate stream evideoi to a receiver via a communications network such as a wireless or cable network.

In other embodiments this transmitter will further include a combining means denoted F in FIG. 1. This device is adapted to receive the encoded common video stream evideo0 and the encoded intermediate stream evideoi from the encoding apparatus EA, and is further adapted to select per frame and per slice number one slice of either streams, for thereby forming an encoded composed video stream which will comprise a sequence of the same number of frames, and the same number of slices per frame. In FIG. 1 this resulting encoded composed video stream is denoted evideofinal, and comprises again a sequence of m frames, each frame comprising 2 slices of macroblocks. For slice 1 the slices from the common video stream are selected, whereas for slice 2 the slices from the input stream of personalized information are selected. It is easy to understand that other combinations could be made, such as merely selecting the slices of the common stream, or merely the slices from the personalized input stream, or the other combination, i.e. slice1 from the personalized stream and slice2 from the common stream.

Compared to the prior art situation whereby for each of these 4 resulting streams separate encoders were needed in case these streams had to be sent to 4 different receivers, now only 2 encoders and one combining means are needed. Also standard AVC compliant decoders can be used to create personalized content, possibly equipped with FMO support to have a more optimal slice grouping scheme in case the latter scheme is used. This is opposed to present set-op boxes with complex graphical capabilities.

These advantages will be come even more pronounced in case many different input streams of personalized information are to be mixed with a common video stream for being transmitted to one or several users or user groups. The common video stream can consist of a television program, and the different input streams can be different logo's or types of advertisements, dedicated to different user groups. Examples are dedicated advertisements for some pet food for users having pets, and other advertisements focused to other users such as advertisements for diapers for families with babies, etc. In the prior art situation each of these advertisements had to be mixed with the common video stream for encoding and later transmission. Now an input stream may comprise these different advertisements in different picture regions, each pertaining to a different position in the stream. Encoding of the mixed intermediate stream only has to occur once, and the combining means can accordingly select which one of the slices will be used for generating the combined encoded composed stream.

A situation for n different input streams, each pertaining to different personalized information, is shown in FIG. 2. Again the common stream is denoted video0, and the n different input streams are denoted input1 to inputn. As in FIG. 1, these input streams are mixed with the common video stream to generate n intermediate streams video1 to videon. The respective mixers are denoted M1 to Mn. As in FIG. 1 these mixers have to take into account a macroblock grouping step, mapping the position where personalized information is mixed in the common stream to a slice group region, itself being represented by a slice number. The result of this mixing is an intermediate video stream denoted videoi, comprising the common video stream, but with the personalized information present in the position identified by the macroblock grouping regions. Similar considerations apply as for the case of only one input stream, i.e. the mixer has to receive or contain the necessary control information to identify the different positions where the personalized input stream has to be added to the common video stream. This position is expressed by means of a set of picture regions coinciding with the macroblocks belonging to a slice. The n intermediate streams are encoded in n respective AVC encoders, denoted E1 to En. As previously mentioned, it is important that this macroblock grouping scheme is compliant to the one used for the mixing step, meaning that the picture regions where the input stream has been added to the common video stream for the generation of the intermediate stream, are now also used for the encoding and mapping of macroblocks into slices. The common video stream is encoded using this same macroblock grouping too, using encoder also denoted E0. Again a sequence of a number of frames, each frame comprising a predetermined number of slices of macroblocks, is provided by these encoders. In FIG. 2 again a sequence of m frames is shown, each frame again comprising 2 slices. It is however evident that any number of frames and slices is applicable to using the invention.

All mixers and encoders are comprised in an encoding apparatus EA according to the invention. This encoding apparatus is thus adapted to receive the n input streams of personalized information, input 1 to input n, as well as the common video streamvideo0, and to generate n+1 encoded video streams, using this macroblock grouping, denoted evideo0 to evideon. Again the different contents of the different slices is indicated by means of the filling of the small boxes denoting the different slices. Again the slices of the common video stream are indicated as blank boxes. For encoded intermediate stream evideo1 the consecutive frames for slice 1 are the same as those of the common video stream, but the consecutive frames for slice 2 are different, being indicated by the speckled boxes. For encoded intermediate stream evideoi the consecutive frames for slice 2 are the same as those of the common video stream; the contents is however different for the slice 1, as being indicated via the brick-filing. And for encoded intermediate stream evideon again the first slices are common to these at the common video stream, but the second slices are different as indicated by means of the grey-coloured boxes.

A combining means denoted F then has to select for each slice number only one slice of the n+1 files such that an encoded composed stream, which will result from this selection will contain a sequence of the selected slices. In FIG. 2 the resulting encoded composed video stream will have the first slices from encoded intermediate stream evideoi and the second slices from encoded intermediate stream evideo1.

It is evident that in this way a lot of combinations can be made. Again the encoding apparatus EA is often incorporated in transmitters which can in certain embodiments also comprise the combining means F. In other embodiments the transmitters only comprise the encoding apparatus whereas the combining means are either part of the receiver itself, or can be part of an intermediate node within the network, such as an access node in a DSL network, a residential gateway for an in-home network, etc.

In case the combining means forms part of a transmitter or of an intermediate node, the combining means may be adapted to generate several of these encoded composed video streams, which can then be further transmitted to the appropriate users. The different encoded composed video streams are then each pertaining to a specific user profile, which is also linked to the specific users or user groups. Also in this case the combining means and transmitter or intermediate node need to receive or have at their possession necessary control information related to the appropriate slice selection and transmission, such that the correct final encoded composed stream will arrive at the correct user or receiver.

It is important to mention that the mixers, the different encoders and the combining means are to cooperate together for the well-functioning of the method. One way to achieve this is a means of central control block, denoted CM in both FIG. 1 and FIG. 2, for providing the appropriate control signals to the mixers, encoders and combining means. These control signals are indicated by means of the arrows between the control block CM and the different mixers, encoders and the combining means F, and may contain information to indicate the regions of the image belonging to a given slice, putting constraints on the possible encoder decisions to ensure correctness of the temporal dependencies, the reference decisions made by encoder0 to ensure correctness of the temporal reference pictures used by the encoders, sequence and picture parameter settings, etc.

However in other embodiments this central coding can be replaced by some preprogrammed intelligence within the devices themselves such that they can only function in an interoperable way. In yet other embodiments a bi-directional control coupling between all mixers, encoders and combining means and the control means CM is present.

While the principles of the invention have been described above in connection with specific apparatus, it is to be clearly understood that this description is made only by way of example and not as a limitation on the scope of the invention, as defined in the appended claims.

The invention claimed is:

1. Method for generating an encoded composed video stream, based on a common video stream and at least one input stream of personalized information, said method comprising:
generating at least one intermediate stream by mixing said at least one input stream into said common video stream;
encoding said at least one intermediate stream for thereby generating at least one encoded intermediate stream;
wherein said at least one intermediate stream is generated by adding said at least one input stream in predetermined positions of said common video stream, taking into account a macroblock grouping in slices;
said method further including encoding said common video stream using said macroblock grouping, thereby generating an encoded common video stream comprising a sequence of encoded video frames, each encoded video frame comprising a sequence of a predetermined number of slices of encoded macroblocks of said common video stream;
whereby said at least one intermediate stream is encoded by using said macroblock grouping, such that said at least one encoded intermediate video stream comprises a sequence of frames of said predetermined number of slices of encoded macroblocks of said at least one intermediate video stream;
and said method further including combining and filtering said encoded common video stream and said at least one encoded intermediate stream such that per frame and per slice sequence number only one slice of one stream is selected for forming said encoded composed video stream.

2. The method according to claim 1 further comprising transmitting said encoded composed video stream via a network to a receiver.

3. The method according to claim 1 wherein forming said encoded composed video stream is performed after reception of said encoded common video stream and of said at least one encoded intermediate stream at a receiver.

4. The method according to claim 1 wherein said at least one encoded intermediate video stream and said encoded common video stream are transmitted by a transmitter via a network to an intermediate node and wherein combining and filtering said encoded common video stream and said at least one encoded intermediate stream thereby forming said encoded composed video stream is performed within said intermediate node of said network, the method further comprising transmitting said encoded composed video stream from said intermediate node to a receiver.

5. The method according to claim 4 wherein, for said intermediate node being coupled to a plurality of receivers, each receiver pertaining to a specific user profile, a plurality of said encoded composed video streams is generated within said intermediate node, each encoded composed video stream thereby corresponding to one of said specific user profiles, for further transmission by said intermediate node to the corresponding receiver.

6. An apparatus including:
an encoding apparatus for generating an encoded common video stream and at least one encoded intermediate stream;
said encoding apparatus being adapted to receive a common video stream and at least one input stream of personalized information;
said encoding apparatus further including at least one mixer for mixing said common video stream and said at least one input stream for thereby generating at least one intermediate stream;
said encoding apparatus further including at least one encoder for encoding said at least one intermediate stream into said at least one encoded intermediate stream;
wherein said at least one mixer is adapted to generate said at least one intermediate stream by adding said at least one input stream in predetermined positions of said common video stream, taking into account a macroblock grouping in slices;
said encoding apparatus further includes a further encoder for encoding said common video stream using said macroblock grouping, for thereby generating an encoded common video stream comprising a sequence of encoded video frames, such that each encoded video frame comprises a sequence of a predetermined number of slices of encoded macroblocks of said common video stream;
said at least one encoder is further adapted to encode said at least one intermediate stream, by using said macroblock grouping, so as to generate said at least one encoded intermediate stream comprising a sequence of frames of said predetermined number of slices of encoded macroblocks of said at least one intermediate video stream.

7. The apparatus according to claim 6 wherein the encoding apparatus is included in a transmitter for transmitting encoded video streams.

8. An apparatus including a combining component adapted to combine and filter an encoded common video stream and at least one encoded intermediate stream, which comprises an input stream added at predetermined positions of said common video stream prior to encoding of the intermediate stream, for thereby generating an encoded composed video stream, said combining component being adapted to receive said encoded common video stream comprising a sequence of encoded video frames, each encoded video frame comprising a sequence of a predetermined number of slices of encoded macroblocks of a common video stream, and to receive said at least one encoded intermediate stream comprising a sequence of encoded video frames of said predetermined number of slices of encoded macroblocks of at least one intermediate video stream, said combining component being further adapted to combine and filter said encoded common video stream and at least one encoded intermediate stream, such that per frame and per slice sequence number only one slice of one stream is selected for generating said encoded composed video stream.

9. The apparatus according to claim 8 wherein said combining component is further adapted to generate a plurality of different ones of said encoded composed video streams, each encoded composed video stream thereby corresponding to a specific user profile.

10. The apparatus according to claim 7 wherein said transmitter further includes a combining component.

11. The apparatus according to claim 8 wherein the combining component is included in a receiver for receiving encoded video streams.

12. The apparatus according to claim 8 wherein the combining component is included in an intermediate node of a network for transmitting encoded video stream.

13. The intermediate node according to claim 12 whereby, for said intermediate node being coupled to a plurality of receivers, each receiver pertaining to said specific user profile, said intermediate node being further adapted to transmit said different encoded composed video streams to the respective receivers in accordance to said specific user profile.

* * * * *